May 29, 1951    LE ROY V. JACOBSEN ET AL    2,554,621
MEASURING MEANS FOR DETERMINING CAMBER
AND CASTER OF VEHICLE WHEELS
Filed Oct. 29, 1948

INVENTOR.
G. G. GOSLINE
BY L. V. JACOBSEN
Merrill M. Blackburn
Atty.

Patented May 29, 1951

2,554,621

UNITED STATES PATENT OFFICE 2,554,621

MEASURING MEANS FOR DETERMINING CAMBER AND CASTER OF VEHICLE WHEELS

Le Roy V. Jacobsen, Durant, Iowa, and Gilbert G. Gosline, Rock Island, Ill., assignors to Bee-Line Company, Davenport, Iowa, a copartnership Application October 29, 1948, Serial No. 57,152

2 Claims. (Cl. 33—203.18)

Our present invention relates to means useful to automobile mechanics in determining camber and caster of vehicle wheels. Among the objects of this invention are the provision of means for accurately determining these two factors of motor vehicle geometry, which means is concerned more particularly with automobiles since these travel at higher speeds than trucks and, therefore, errors of geometry have a greater effect thereon; the provision of a gauge having means for making a temporary record of the caster of a vehicle wheel without writing same down; the provision of an apparatus of the character indicated which can be attached to a motor vehicle wheel so as to remain in proper position thereon while the wheel inclination is being checked; and such further objects, advantages, and capabilities as will hereafter appear and as are inherent in the construction disclosed herein. Our invention further resides in the combination, construction, and arrangement of parts illustrated in the accompanying drawings and, while we have shown therein what is now regarded as the preferred embodiment of this invention, we desire the same to be understood as illustrative only and not to be interpreted in a limiting sense.

In the drawings annexed hereto and forming a part hereof,

Figure 1:
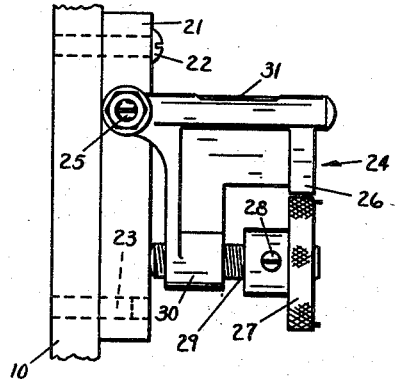
Fig. 1 is a side elevation of a gauge embodying this invention.

Reference will now be made in greater detail to the annexed drawings for a more complete description of this invention. A supporting standard 10 of substantially square cross-section for supporting the gauge has an arm 11 rigidly secured to a sleeve 12 and has its free end notched, as shown at 13, for engagement with the edge of the wheel rim 14. A pivoted clamping member 15 is pivotally mounted on the arm 11 and may be turned by a thumb screw 16 to cause the arm 11 and the clamp 15 to rigidly engage the edge of the rim and hold the standard 10 supported thereon. A set screw 17 is used to clamp the sleeve 12 to the standard 10 and hold it in vertically adjusted position.

Adjustably secured adjacent the lower end of the standard 10 is a cross-arm 18 which has at its ends a pair of arms 19 of substantially the same length as the arm 11. These also engage the rim of the wheel and hold the standard 10 parallel thereto. On the cross-arm 18 there is secured a level 20 which may be used in plumbing the standard in order that the gauge readings may be correct.

Figure 2:
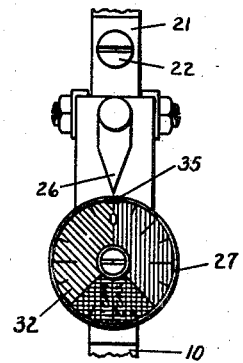
Fig. 2 is a face elevation thereof.
Figure 5:
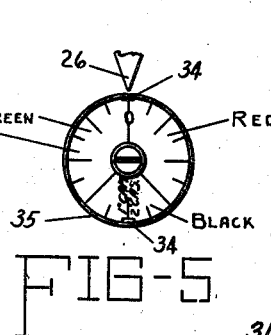
Fig. 5 represents a face view of the dial with a part of the pointer shown fragmentarily.
Figure 4:
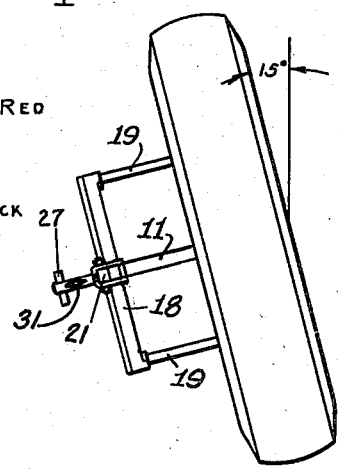
Fig. 4 is a plan view of a wheel turned in one direction through an arc of fifteen degrees (15°)
Figure 7:
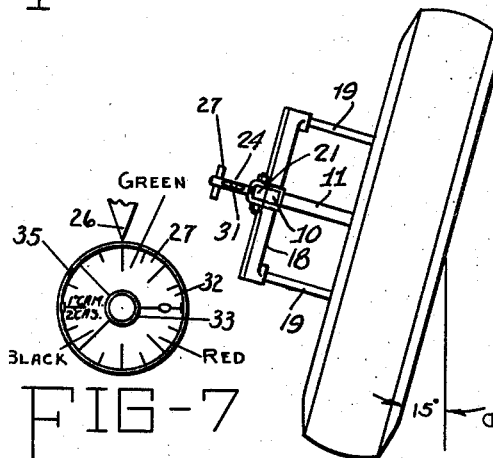
Fig. 7 represents a dial setting which indicates one-half degree (½°) camber or one degree (1°) caster.
Figures 6, 8:
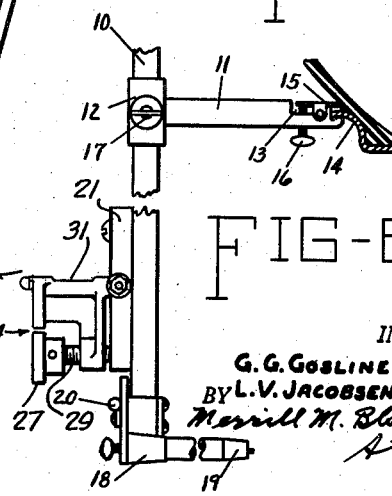
Fig. 6 represents a plan view of a wheel turned through an arc of fifteen degrees (15°) beyond zero, in one direction, opposite to that shown in Fig. 4.
Fig. 8 represents the side elevation of the means for supporting the structure of Fig. 1 or Fig. 2 on the rim of a wheel, the rim and a part of the tire being shown in section, and the gauge-supporting means in elevation, fragmentarily.

Approximately midway between the arms 11 and 19, a block 21 is secured to the standard 10 by a screw 22 and a pin 23 which keep the gauge from moving sidewise with relation to the standard. The gauge 24 is pivotally connected to the block 21 by a pivot bolt 25 upon which the gauge 24 may turn in a vertical direction, freely. The gauge has a pointer 26 which cooperates with the gauge scale 32 on the face of the head 27, as shown in Figs. 2, 5, and 7. The head 27 is held rigidly by a set screw 28 to the screw-threaded shaft 29 which is threadedly connected with the arm 30 of the gauge. Therefore, as the head 27 and screw-threaded shaft 29 are turned in the arm 30, the level bubble 31 will be caused to shift longitudinally of the level because of the change in the position of the gauge, resulting from the turning of the screw-threaded shaft 29.

Figure 3:
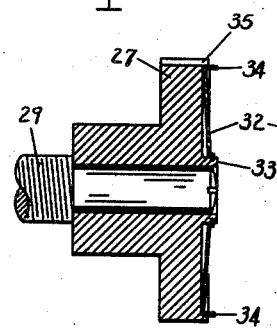
Fig. 3 represents a section through the dial of this construction.

As shown in Fig. 3, the face of the head 27 is recessed to form a receptacle to receive the graduated dial 32 which has a central aperture to receive the central part 33 of the head 27, not cut away when forming a recess for the gauge plate or graduated dial 32. The outer periphery of this projecting part 33 has a groove cut therein so that the inner periphery of the gauge dial can snap into it and hold the dial in place, or a spring washer may be snapped into this groove. However, this dial is provided with fingers 34 by which it can be turned about the axis of the head 27 and the screw-threaded shaft 29. In this way, the dial can be set with relation to the head 27 to any desired reading.

When it is desired to use this instrument, the reduced end of the arm 11 is inserted under the edge of the wheel rim 14 and the clamping member 15 is brought down on the top of it by turning in the screw 16 which causes the instrument to be clamped to the upper edge of the rim. At this time, the lower arms 19 should engage the lower part of the rim 14 above the rim flange and against the shoulder thereof. If the length of the standard 10 is not properly adjusted so that this takes place, then the set screw 17 can be loosened so that the standard 10 can be slid through the sleeve 12 until a proper length adjustment is secured. If the horizontal level 20 does not indicate that the standard is plumb in that direction, then the upper arm 11 is moved until the standard 10 is vertical or the wheel is moved until the level indicates that the standard is plumb. The head 27 is turned until the notch 35 in the edge of the head is opposite the pointer 26, and then it is held in that position while the dial 32 is turned until zero is up, that is, until it is opposite the pointer 26. Now, the screw-threaded shaft 29 is turned by turning the head 27 until the level bubble 31 is centered. If the head 27 has to be turned to the left so that the red part of the dial passes under the pointer, this indicates negative camber, and the amount of camber can be read from the dial. Turning the head 27 one hundred eighty degrees (180°), to the line which is marked "1° cam.," indicates one degree (1°) negative camber. On the other hand, if the head 27 is turned to the right so that the green sector of the dial passes under the pointer, then this indicates positive camber, and turning the head one hundred eighty degrees (180°) indicates one degree (1°) positive camber. This dial 32, as shown in the drawings, is divided into quarters, eighths, and sixteenths. Therefore, it is obvious that, if the head is turned through ninety degrees (90°), it indicates one-half degree (½°) camber, et cetera.

If it is desired to read the caster, no special setting of the front wheels is required. The front wheels are turned to right or left fifteen degrees (15°), and then the head 27 is turned so that the level bubble indicates level. Then the dial 32 is turned until the zero is opposite the indicator 26 and the wheels are turned fifteen degrees (15°) beyond straight ahead position. Now the head 27 is turned to again level up the level 20, and the reading between the zero on the dial 32 and the pointer or indicator 26 is read, and this gives a reading of caster. In reading this dial, one must remember that the graduations have twice the value in reading caster that they have in reading camber.

It is of course understood that the specific description of structure set forth above may be departed from without departing from the spirit of this invention or the scope thereof as set forth in the appended claims.

Having now described our invention, we claim:

1. In a wheel alignment gauge, the combination of a supporting framework to be attached to the rim of a motor vehicle wheel, said framework comprising an upright standard having a laterally projecting, vertically adjustable arm connected to the upper part thereof, a clamp at the end of the arm for attachment to the edge of the wheel rim, and means for causing the clamp to grip the wheel rim and hold the gauge attached to the rim, said upright standard having a block secured to a side thereof and a pivotally mounted second block intermediate the ends of the first block, a screw passing through the blocks and serving as a pivot about which the second mentioned block may be turned, and a screw having a recessed head with a graduated dial in the recess of the head, the dial being rotatable in said recess, with relation to said head.

2. A vehicle wheel gauge comprising a standard having an attaching arm slidably mounted thereon, means for holding said arm in adjusted position on the standard, a clamp on the free end of the arm for clamping connection to a wheel rim, and a level for plumbing the standard in one direction, a level block having arms extending laterally from one side thereof, said arms being provided with holes for the reception of a pivot member, a pivot member passing through said arms and said standard, whereby to pivotally connect the level block to the standard, an adjusting screw passing through the block and bearing against the standard to assist in reading the inclination of the standard with respect to the vertical, said screw having on its exposed end an enlarged head provided with a recess on its exposed face and a graduated dial set into the recess, said dial being rotatable with and independently of the head.

LE ROY V. JACOBSEN.
GILBERT G. GOSLINE.

REFERENCES CITED

The following references are of record in the file of this patent:

UNITED STATES PATENTS

| Number | Name | Date |
|---|---|---|
| 1,644,111 | Dearborn | Oct. 4, 1927 |
| 1,653,249 | Bennett | Dec. 20, 1927 |
| 2,137,485 | Greenleaf et al. | Nov. 22, 1938 |
| 2,171,616 | Wilkerson | Sept. 5, 1939 |
| 2,206,817 | Mann | July 2, 1940 |
| 2,285,965 | Halstead | June 9, 1942 |

FOREIGN PATENTS

| Number | Country | Date |
|---|---|---|
| 317,275 | Germany | Dec. 13, 1919 |